3,763,098
LOW TEMPERATURE EPOXY CURING
ACCELERATORS AND SYSTEM
Harold A. Green, Havertown, and Robert G. Petrella, Philadelphia, Pa., assignors to Air Products and Chemicals, Inc., Philadelphia, Pa.
No Drawing. Original application Apr. 18, 1969, Ser. No. 818,470, now Patent No. 3,642,649. Divided and this application Feb. 3, 1971, Ser. No. 112,447
Int. Cl. C08f 45/72; C08g 51/84
U.S. Cl. 260—47 EN                    7 Claims

ABSTRACT OF THE DISCLOSURE

Low temperature epoxy curing accelerators are prepared from tertiary amine salts of hydrobromic acid, paratoluene sulfonic acid, 2-ethylhexoic acid or thiocyanic acid, wherein the tertiary amine is either triethylene diamine, methyl triethylene diamine or 2-ethyl-4-methyl imidazole.

CROSS-REFERENCE TO RELATED APPLICATION

This is a division of application Ser. No. 818,470, filed Apr. 18, 1969, now U.S. Pat. No. 3,642,649.

BACKGROUND OF THE INVENTION

The present invention relates to epoxy curing accelerators and the use of said accelerators. More particularly, the present invention relates to certain tertiary amine salts of hydrobromic acid, paratoluene sulfonic acid, 2-ethylhexoic acid or thiocyanic acid which will accelerate the curing of epoxy resins at low temperatures.

Since epoxy compositions for flooring and maintenance coating applications can be formulated for specific applications which require properties such as ease of maintenance, high compressive strength, skid resistance, abrasion resistance and good chemical resistance, epoxy flooring and maintenance coating formulations have been used extensively in dairies, food processing plants, industrial and chemical plants, breweries, bakeries, hotel and hospital kitchens, cafeterias, high-rise construction, airports and other public buildings. For these applications, the property of low temperature curing is a desirable characteristic in the epoxy flooring or maintenance coating system which is utilized.

It is known that acid anhydrides show little activity as curing agent for epoxy resins at either room temperature or at slightly elevated temperatures. Instead, acid anhydrides are effective only at very high temperatures and even then in many cases they act very slowly. It has been proposed that tertiary amines be used as curing accelerators for the acid anhydrides, but this has not overcome all of the problems involved. For example, many of the amine accelerators speed the curing operation at higher temperatures but do not permit the use of lower temperatures. In other cases, the presence of the accelerator has a detrimental effect on the properties of the resulting product. Moreover, anhydride curing agents are considered capable of causing severe eye and skin irritation, even burns, depending on the severity of contact.

Known low temperature epoxy curing agents, such as polyamines and polymercaptans, not only have the drawback of being ordorous, but present a high dermatitis hazard. In general, the order of dermatitis hazard ranges from a severe hazard with mercaptans to a lower potential hazard with modified amines, amido-amines and polyamides. Aliphatic amines, for example, are skin irritants. They are not only capable of causing dermatitis, but are capable of sensitizing some individuals so that even very brief exposure become toxic. Edema or even necrosis may result. Aromatic amines, while less irritating to the skin and less prone to cause skin sensitization responses, present a very serious hazard if acquired internally.

SUMMARY OF THE INVENTION

An object of the present invention is to provide a low temperature epoxy curing system.

Another object of the present invention is to provide certain tertiary amine salts of hydrobromic acid, paratoluene sulfonic acid, 2-ethylhexoic acid or thiocyanic acid which will accelerate epoxy curing agents in a manner such that epoxy resins are cured at a practical and acceptable rate at temperatures as low as 35° F.

Still another object of the present invention is to provide low temperature epoxy curing systems for epoxy maintenance coating and flooring applications which will result in superior properties in the resulting coating film.

Yet another object of the present invention is to provide low temperature epoxy curing systems which present a relatively low dermatitis hazard.

These, and other objects of the present invention, are accomplished by preparing certain tertiary amine salts of hydrobromic acid, paratoluene sulfonic acid, 2-ethylhexoic acid or thiocyanic acid and using these salts to accelerate the curing of epoxy resin formulations which employ amido-amine, modified amine, or polyamide curing agents. Tertiary amines which have been discovered to be particularly effective are triethylene diamine, methyl triethylene diamine and 2-ethyl-4-methyl imidazole.

DESCRIPTION OF THE PREFERRED EMBODIMENTS

The three principal ingredients essential for the system of the present invention are an epoxy resin, a curing agent and a particular tertiary amine salt of hydrobromic acid, paratoluene sulfonic acid, 2-ethylhexoic acid or thiocyanic acid.

Any epoxy resin which finds application in floorings and/or maintenance coatings can be employed. Suitable commercial epoxy resins based on diglycidylethers of bisphenol A and their characteristics are listed below:

| Resin | Epoxide equivlent | Viscosity (poises) |
|---|---|---|
| Epon 820 | 185–205 | 40–100 |
| Epon 826 | 180–188 | 65–95 |
| Epon 828 | 185–192 | 100–160 |
| Epon 1001 | 425–550 | ¹Solid |
| Epon 1002 | 600–700 | ¹Solid |
| Epon 1004 | 875–1025 | ¹Solid |
| Araldite 741–X75 ² | 450–530 | 46–93 |
| Araldite 507 | 185–192 | 5–7 |
| Araldite 6005 | 182–190 | 70–100 |
| Araldite 6010 | 185–196 | 120–160 |

¹ At room temperature.
² 75% solids in xylene.

In general, epoxy resins which find application in floorings have an epoxide equivalent ranging between 170–210. Typically, two types of the low viscosity epoxy resins are used for flooring applications. One type is the highly refined epoxy resin that contains a minimum amount of high molecular weight fractions, e.g., Epon 826; while the other type contains monoepoxide diluents such as phenyl glycidyl ether and butyl glycidyl ether, e.g., Epon 820. Epoxy resins which find application in maintenance coatings have an epoxide equivalent ranging between 425 and 900.

Curing agents for epoxy flooring and maintenance coatings of the present system include amido-amines, modified amines and polyamides. For example, suitable commercial curing agents such as the Pentamids may be employed. Pentamide are polyamides obtained by the condensation of polymerized fatty acid and polyamine.

Typical properties of various Pentamids are shown below:

|  | Pentamid | | | |
| --- | --- | --- | --- | --- |
|  | 800 | 815 | 825 | 840 |
| Amine value | 85–95 | 230–246 | 330–360 | 350–400 |
| Non-volatile content, percent | 100 | 100 | 100 | 100 |
| Color, Gardner | 12 | 12 | 12 | 12 |
| Viscosity, poises at 40° C | 7–12 | 500–750 | 80–120 | 30–60 |
| Flash point degrees F. open cup | 617 | 295 | 265 | 365 |

[1] Poises at 150° C.

Pentamids are relatively non-toxic and are not classified as skin sensitizers.

Another curing agent which may be used in the present invention is Araldite Hardener 956. This curing agent is a low viscosity, modified amine hardener which exhibits low irritation and skin sensitizing effects on contact. The characteristics of Araldite Hardener 956 are set forth below:

Viscosity, centipoises, at 25° C. _____ 300–600.
Amine nitrogen value, percent _____ 23.5–27.0.
Color, Gardner _____ 7 max.
Flash point, open cup _____ 350° F. (average).
Weight per gallon, pounds _____ 8.8 (average).

Another curing agent which may be employed is Araldite Hardener 955 which is a modified liquid amido-amine hardener having the following characteristics:

Viscosity, centipoises, at 25° C. _____ 500–900
Equivalent weight (approx.) _____ 65
Weight per gallon, pounds _____ 8.2
Flash point, open cup, ° F. _____ 300

A solvent blend comprising a 2 to 1 mixture of nitropane and methanol has been found to be particularly effective for maintaining salts of triethylene diamine in solution with an amido-amine curing agent (Hardener 955) and preventing the precipitation of triethylene diamine or triethylene diamine salt. In addition, it has been found that the stability of mixtures of Hardener 955 and the thiocyanic acid salt of triethylene diamine can be improved, with no loss in activity, from a period of 3 to 4 days to a period in excess of 90 days, by the addition of 5 to 10 parts per hundred parts of resin of a low viscosity, i.e., less than about 70 poises at 40° C., polyamide such as Pentamid 840.

Curing agents such as the commercially available Epi-Cure 865 (amido-amine) and Epi-Cure 872 (25:10 ratio by weight of amido-amine and modified amine) may also be employed. The characteristics of these curing agents are set forth below:

|  | Epi-Cure 855 | Epi-Cure 872 |
| --- | --- | --- |
| Viscosity, centipoises | 150–400 | 450–750 |
| Specific gravity | 0.94–0.96 | 0.97–0.99 |
| Equivalent weight | 90 | 65 |

The accelerators of the present invention can be prepared by reacting certain tertiary amines, e.g., triethylene diamine, methyl triethylene diamine and 2-ethyl-4-methyl imidazole, with hydrobromic acid, paratoluene sulfonic acid, 2-ethylhexoic acid or thiocyanic acid. The reaction is carried out in standard fashion with proper care simply by reacting the appropriate quantities of the acid and the amine base. When ammonium thiocyanate is employed as the precursor of the thiocyanic acid the reaction is carried out in a solvent, such as water. Other solvents, such as hexane for methyl triethylene diamine, may be used, but are not preferred. The resulting solvent mixture is then heated to and maintained at reflux conditions—preferably until the evolution of ammonia ceases. The desired tertiary amine salt of hydrobromic acid, para-toluene sulfonic acid, 2-ethylhexoic acid or thiocyanic acid is recovered directly as product or as the residue after evaporating the solvent. Recrystallization from isopropanol or n-butanol or mixtures thereof, may be employed.

The tertiary amine salts of hydrobromic acid, para-toluene sulfonic acid, 2-ethylhexoic acid or thiocyanic acid are used to accelerate the curing of polyepoxides by simply admixing the above-identified accelerators with the curing agent and the polyepoxide. The accelerator and curing agent should be combined together before they are added to the polyepoxide to avoid possible irregular curing due to the presence of particles of undissolved accelerator.

In general, the resin to curing agent ratios for the present system are not critical. It will be understood, however, that the physical properties of the cured epoxy resin can be varied by proper selection of the resin to curing agent ratios and the amount of accelerator employed. The following table illustrates appropriate ranges for flooring and maintenance coating formulations:

FLOORING FORMULATIONS

| Accelerator [1] | Curing agent | Ratio of accelerator to curing agent [2] | Amount of curing agent employed (phr.[3]) |
| --- | --- | --- | --- |
| 1 or 2 | Amido-amine or modified amine | 0.15:1 to 0.73:1 | 11 to 50. |
| 1 or 2 | Polyamide | 0.08:1 to 0.24:1 (preferred range 0.1:1 to 0.15:1) | 35 to 90 (preferred range 40 to 65) |
| 3 | Amido-amine or modified amine | 0.36:1 to 0.072:1 (preferred range 0.04:1 to 0.06:1) | 11 to 50. |
| 3 | Polyamide | 0.01: to 0.15:1 | 35 to 90 (preferred range 40 to 65) |

[1] 1=Methyl triethylene diamine salts, 2=triethylene diamine salts; 3=2-ethyl-4-methyl imidazole salts.
[2] Absolute ratio.
[3] Phr=Parts based on 100 parts of epoxy resin.

MAINTENANCE COATINGS

| Accelerator [1] | Curing agent | Ratio of accelerator to curing agent [2] | Amount of curing agent employed percent of concentration recommended by manufacturer) |
| --- | --- | --- | --- |
| 1 | Amido-amine | 0.1:1 to 0.35:1 | 70 to 150. |
| 1 | Modified amine | 0.19:1 to 0.54:1 | Do. |
| 1 | Polyamide | 0.1:1 to 0.3:1 | Do. |
| 2 | Amido-amine | 1:2 to 1:10 (preferred range 1:4 to 1:6) | 70 to 140 (preferred range 90 to 120). |
| 2 | Modified amine | 0.16:1 to 0.55:1 | 70 to 150. |
| 2 | Polyamide | 1:2 to 1:12 (preferred range 1:4 to 1:6) | 75 to 150 (preferred range 90 to 120). |
| 3 | Amido-amine | 0.017:1 to 0.12:1 | 70 to 150. |
| 3 | Modified amine | 0.036:1 to 0.12:1 | Do. |
| 3 | Polyamide | 0.01:1 to 0.15:1 | Do. |

[1] 1=methyl triethylene diamine salts; 2=triethylene diamine salts; 3=2-ethyl-4-methyl imidazole salts.
[2] Absolute ratio.

Polyepoxides may be cured with the low temperature epoxy curing system of the present invention over a wide range of temperatures. For example, the tertiary amine salts of the present invention will act to accelerate the epoxy curing agents in a manner such that epoxy resins are cured at a practical and acceptable rate at temperatures as low as 35° F. Curing may also be accomplished by merely mixing the accelerator-curing agent combination together with the polyepoxide, as indicated above, and then letting the mixture stand at room temperature. In some applications, however, it may be desirable to effect a more rapid cure and this may be accomplished by raising the temperature for those applications where heating is permissible.

It has been discovered that extremely rapid curing is obtained using either triethylene diamine or methyl triethylene diamine as the tertiary amine and including 0.3 to 2.4 parts of water per hundred parts of the resin, with a preferred range of 0.4 to 0.9 part of water per hundred parts of resin.

The epoxy flooring compositions of the present invention can be applied using established techniques to a variety of substrates, such as concrete, steel, wood, bituminous asphalt, tile and terrazzo, and then permitted to cure.

Finely divided material, such as silica flour, talc, and calcium carbonate, can be used as filler. The amount of filler can be varied to obtain the desired viscosity. For flooring applications, however, between 400 and 600 phr. of graded sand may be added. The use of aggregates, such as silica, limestone, granite, etc., can be used to modify the strength, loading capacity, chemical resistance, appearance and wearing characteristics of epoxy flooring.

Maintenance coatings find particular application where a tough and impervious surface is desired. A variety of means, such as, spraying, dipping, brushing, roller coating, etc., can be employed to apply the maintenance coatings. Often it is desirable to include a corrosive resistance pigment in the maintenance coating compositions. Examples of pigments which may be used include lead chromate, basic lead silico-chromate, zinc oxide, and iron oxide.

Reactive diluents include butyl glycidyl ether and phenyl glycidyl ether. However, no reactive diluent is completely free of skin sensitizing properties. Non-reactive diluents include pine oil and di-butyl phthalate. Generally, the total quantity of non-reactive diluent employed is greater than 10 phr., but less than 30 phr.—with 15 to 20 phr. normally being preferred.

Solvents may be added for achieving the desired fluidity. They may be volatile solvents which evaporate before or during the curing, e.g., ketones such as acetone, methyl ethyl ketone, methyl isobutyl ketone, esters such as ethyl acetate, butyl acetate, ethylene glycol monoethyl ether acetate and ethylene glycol monomethyl ether acetate; and chlorinated hydrocarbons such as trichloropropane and chloroform.

Diethyl phthalate, dibutyl phthalate and adiponitrile are examples of plasticizers which can be used.

It will be understood that various other known additives, including fibrous materials, dyes and resins, may be used with the epoxy flooring and maintenance coatings of the present invention.

The invention will be illustrated by the following specific examples, it being understood that there is no intention to be necessarily limited by any details thereof since variations can be made within the scope of the invention.

EXAMPLE 1

The triethylene diamine salt of thiocyanic acid was prepared by adding 113.1 grams (1.01 mols) of triethylene diamine to a three-neck liter flask equipped with a magnetic stirring bar. 181.3 grams of distilled water was added to dissolve the triethylene diamine.

A solution of 78.1 grams (1.03 mols) of $NH_4SCN$ dissolved in 127.2 grams of distilled water was added to the flask from a beaker. The beaker was then rinsed with 54.0 grams of distilled water, which was also added to the flask. The combined weight of the flask and ingredients was 877.4 grams.

After refluxing for 6 hours at 104° C., the flask was cooled and weighed. The total weight of the flask and ingredients was 859.3 grams. The weight loss of 17.6 grams is equivalent to a loss of 1.03 mols of ammonia. The water was then driven off, leaving the triethylene diamine salt of thiocyanic acid.

EXAMPLE 2

113.0 grams (1.01 mols) of triethylene diamine were dissolved in 140.4 grams of distilled water and added to a tared three-neck liter flask. A solution containing 77.3 grams (1.01 mols) of ammonium thiocyanate dissolved in 108.7 grams of water was added and the mixture was heated to reflux conditions.

When the evolution of $NH_3$ ceased, the reaction mixture was poured into an evaporating dish. The solid triethylene diamine salt of thiocyanic acid was recrystallized from n-butanol and analyzed.

ANALYTICAL DATA

|  | Theoretical | Actual |
| --- | --- | --- |
| Percent Carbon | 49.16 | 48.70 |
| Percent hydrogen | 7.65 | 7.67 |
| Percent nitrogen | 24.54 | 24.45 |
| Percent sulfur | 18.72 | 18.7 |

EXAMPLE 3

The triethylene diamine salt of dithiocyanic acid was prepared by adding 112 grams (1.0 mol) of triethylene diamine to a three-neck flask equipped with a reflux condenser and an additional funnel. 201 grams of water were added and the mixture stirred until the triethylene diamine becomes dissolved.

Two moles of ammonium thiocyanate dissolved in 265 grams of distilled water were then added to the flask at a rate of about 3 cubic centimeters per minute. When the ammonium thiocyanate was completely added, the mixture was refluxed for about 30 hours. The reaction medium was then poured out of the flask and dried at 110° C. for 20 hours. The triethylene diamine salt of dithiocyanic acid was obtained.

EXAMPLE 4

The methyl triethylene diamine salt of thiocyanic acid was prepared by adding 129.3 grams (1.02 mols) of methyl triethylene diamine and 154.3 grams of distilled water to a one liter three-neck flask equipped with a magnetic stirring bar, a stopper and a thermometer well. 0.2 gram of dibutyl phthalate was placed in the thermometer well to facilitate heat transfer.

78.1 grams (1.03 mols) of $NH_4SCN$ were dissolved in 101.9 grams of distilled water and added to the flask from a beaker. The beaker was then rinsed with 56.7 grams of distilled water, which was added to the flask.

The resulting mixture was refluxed for approximately 6 hours. At the end of the 6 hour period the reaction medium was filtered and dried in an oven at 105° C. to obtain the methyl triethylene diamine salt of thiocyanic acid.

ANALYTICAL DATA

|  | Theoretical | Actual |
| --- | --- | --- |
| Percent carbon | 51.89 | 50.8 |
| Percent nitrogen | 22.70 | 22.76 |
| Percent hydrogen | 8.11 | 8.12 |
| Percent sulfur | 17.30 | 18.6 |

EXAMPLE 5

The methyl triethylenediamine salt of thiocyanic acid was prepared by dissolving 63 grams (0.5 mol) of methyl triethylenediamine in 100 grams of hexane. 38 grams (0.5 mol) of $NH_4SCN$ crystals were added to the hexane solution with stirring. The crystals slowly changed in appearance to a yellow, soft, curdly, gelatinous solid.

The product mass was allowed to stand for 72 hours after which the hexane was poured off and the product disolved in a 3 to 1 mixture of isopropanol and water, The solvent was then evaporated and 82 grams (99% yield) of product were recovered.

EXAMPLE 6

The 2-ethyl-4-methyl imidazole salt of thiocyanic acid was prepared by adding 55 grams (0.5 mol) of 2-ethyl-4-methyl imidazole to a flask equipped with a thermometer, a reflux condenser and a magnetic stirrer. 145.1 grams of distilled water were added to the flask. 38.1 grams (0.5 mol) of ammonium thiocyanate dissolved in 55.4 grams of distilled water were then added slowly to the flask and the reaction mixture was refluxed for 15 hours.

At the end of the reflux period, the solution was poured into an evaporating dish and placed in an oven at 210° F. After 3 hours the temperature was raised to 250° F. and bled at this higher temperature for 2 hours. 8.5 grams of 2-ethyl-4-methyl imidazole salt of thiocyanic acid were obtained.

ANALYTICAL DATA

|  | Theoretical | Actual |
| --- | --- | --- |
| Percent carbon | 49,68 | 49,55 |
| Percent hydrogen | 6,52 | 6,67 |
| Percent nitrogen | 24,84 | 25,45 |
| Percent sulfur | 18,94 | 18,9 |

EXAMPLE 7

The methyltriethylene diamine salt of hydrobromic acid was prepared by placing 344 grams of hexane and 125 grams of methyltriethylene diamine (0.99 mol) into a 1 liter flask. 168 grams of 48% hydrobromic acid (0.992 mol) were added to the flask in 20 gram increments while the mixture inside the flask was stirred vigorously. Upon completion of the hydrobromic acid addition, the mixture was stirred for an additional one-half hour. The two phases in the flask were separated and 337 grams of hexane was recovered. The water layer, 292 grams, was dried in an oven at 137° C. until a constant weight was obtained. 199 grams of a brown solid were recovered. The theoretical yield was 206.92 grams. Accordingly a 96.4% yield was obtained.

ANALYTICAL DATA

|  | Theoretical | Actual |
| --- | --- | --- |
| Percent carbon | 40,60 | 39,69 |
| Percent hydrogen | 7,30 | 8,00 |
| Percent nitrogen | 13,50 | 13,45 |
| Percent bromine | 38,50 | ¹38,86 |

¹ By difference.

EXAMPLE 8

The monohydrobromic acid salt of 2-ethyl-4-methyl imidazole was prepared by adding 162 grams of xylene to a 500 cc. flask together with 55 grams of 2-ethyl-4-methyl imidazole (i.e., approximately 0.48 mol). To this solution, 85 grams of 48% hydrobromic acid were added to the flask in 20 gram increments until all of the hydrobromic acid had been added. The mixture was stired for one hour and then the water layer, containing the product, was placed in an evaporating dish.

ANALYTICAL DATA

|  | Theoretical | Actual |
| --- | --- | --- |
| Percent carbon | 37,34 | 36,70 |
| Percent hydrogen | 6,74 | 5,88 |
| Percent nitrogen | 14,50 | 14,52 |
| Percent bromine | 41,48 | ¹42,90 |

¹ By difference.

EXAMPLE 9

The mono para-toluene sulfonic acid salt of triethylene diamine was prepared by first dissolving 17.2 grams of para-toluene sulfonic acid in 150 grams of benzene. 11.2 grams of triethylene diamine were dissolved in 80 grams of benzene and the combined benzene mixtures were allowed to sit for 3 days as the product precipitated out. The product was then dried and identified as the mono para-toluene sulfonic acid salt of triethylene diamine.

EXAMPLE 10

The monohydrobromic acid salt of triethylene diamine was prepared by dissolving 112 grams of triethylene diamine and 200 grams of distilled water. 167 grams of 48% hydrobromic acid solution was then added and the resulting salt was dried at 110° C. The product was identified as the monohydrobromic acid salt of triethylene diamine.

EXAMPLE 11

The 2-ethylhexoic acid salt of triethylene diamine was prepared by adding 147.7 grams of 2-ethylhexylic acid (1.03 mols) to a three-neck flask equipped with a reflux condenser. 112 grams of triethylene diamine (1 mol) were then added to the flask and the mixture was heated to 60° C. The resulting solution turned dark brown and the product was identified as the 2-ethylhexoic acid salt of triethylene diamine.

EXAMPLE 12

The 2-ethyl-4-methyl imidazole salt of acetic acid was prepared by dissolving 55 grams (0.5 mol) of 2-ethyl-4-methyl imidazole in 200 cubic centimeters of acetone. A mixture of 30 grams (0.5 mol) of acetic acid in 100 cubic centimeters of acetone was slowly added to a flask containing the 2-ethyl-4-methyl imidazole.

The resulting reaction mixture was stirred periodically for 4 hours. After standing for 24 hours, the reaction product was separated from the hexane and dried to obtain the desired salt.

In the following examples, the epoxy formulations were evaluated in the following manner: First, the epoxy resin and the curing mixtures were chilled overnight at 40° F. in separate sealed bottles. The next day the two components were mixed together by hand-stirring with a metal spatula for 7 to 8 minutes. The completely mixed formulation was returned to the refrigerator for 30 to 45 minutes residence time, after which it was cast onto glass plates that had been sprayed with a fluorocarbon release coating. The low temperature films were returned to the refrigerator and, later, were periodically checked for tack free time.

The tack free test was performed as follows: A finger was pressed onto the surface of the curing film with moderate pressure for a couple of seconds, after which it was removed. If the finger came away without any "pull" being felt, that time was recorded as the tack free time. Thus, the tack free time is a measure of gel time.

Tack free times were also determined using Federal Specification Test 141a–4061. This test requires an aluminum strip 1″ x 3″ with a 1″ x 1″ square touching the film. The remaining 1″ x 2″ strip is bent as a side arm at such an angle so as to just balance a 5 gram weight. The film is said to be tack free when the side arm falls immediately after a 300 gram weight standing on the 1″ x 1″ square for 5 seconds is removed.

The rate of cross-linking was determined by measuring the film hardness using graded drawing pencils in accordance with known practice in the paint field. The gradations were as follows: 6B (softest), 5B, 4B, 3B, 2B, B, HB, F, H, 2H, 3H, 4H, 5H, 6H, 7H, 8H, 9H (hardest).

Other tests included solvent and acid resistance tests which determined the amount of solvent or acid absorbed or extracted in a particular period of time. For example, in the solvent weight gain test the amount of solvent (xylene-isopropanol in a 1:1 ratio by weight) which is absorbed after a 24-hour or longer immersion period is measured.

EXAMPLE 13

Formulation A and Formulation B were prepared from 50 parts of Araldite 507, 50 parts of Araldite 6005, and 18.4 parts of Hardener 956. In addition, one part of 2-ethyl-4-methyl imidazole and 5 parts of the thiocyanic acid salt of triethylene diamine were added to Formulation B.

Formulations A and B were evaluated and the results of these evaluations are set forth below:

|  | A | B |
|---|---|---|
| Tack free time, hours: |  |  |
| 32-37° F | 51-54 | <23 |
| 73-77° F | 7+ | <3 |
| Pencil hardness: |  |  |
| 2 days, 32-37° F | <6B | [1] B |
| 4 days, 32-37° F | [1] 4B | F-H |
| 2 days, room temperature | H | H |
| Shore D hardness: |  |  |
| 2 days, 32-37° F | <21 | 51 |
| 4 days, 32-37° F | <32 | 70 |
| 2 days, room temperature | 66 | 73 |

[1] Surface tackiness observed.

EXAMPLE 14

A flooring formulation (A) was prepared by blending 100 parts of a 50–50 mixture of Araldite 507 and Araldite 6005 with 26 parts of Hardener 956.

A second flooring formulation (B) was prepared by blending the following ingredients: 100 parts of a 50–50 mixture of Araldite 507 and Araldite 6005, 23.6 parts of Hardener 956, 6 parts of the triethylene diamine salt of thiocyanic acid, 0.6 part of water and 1.0 part of 2-ethyl-4-methyl imidazole.

These formulations were evaluated and the results of the evaluations are shown below:

|  | A | B |
|---|---|---|
| Tack free time, hours, 35-40° F | 15 to 19 | 8 to 11. |
| Pencil hardness: |  |  |
| 2 days, 35-40 °F | F | F. |
| 7 days, 35-40 °F | 2H | 3H. |
| 2 days, R.T.[1] | H | 2H. |
| 7 days, R.T. | 3H | 3H. |
| Chemical resistance, percent wt. gain after immersion in a 1:1 mixture of xylene-isopropanol, cured 7 days: |  |  |
| 40° F | 78.7 | 86.9. |
| R.T. | 10.8 | 12.4. |
| Chemical resistance, percent wt. gain after immersion in 10% acetic acid, cured 7 days: |  |  |
| 40° F | 13.4 | 33.2. |
| R.T. | 18.7 | 28.0. |
| Sand filled composition: |  |  |
| Trowellability | Very good | Good. |
| Ease of casting | Good | Do. |
| Adhesion: |  |  |
| Steel | do | Do. |
| Concrete | ([2]) | ([2]). |
| Compressive strength, p.s.i.: |  |  |
| Days at 40-45° F.: |  |  |
| 1 | 570 | 2,580. |
| 4 | 6,360 | 7,380. |
| Days at 30-35° F.: |  |  |
| 2 | 170 | 270. |
| 3 | 660 | 1,060. |
| 7 | 3,790 | 5,360. |
| 11 | 5,625 | 5,625. |
| Cured 7 days at 77° F | 14,000 | 12,000. |
| Top coat residual surface tack, cured 7 days: |  |  |
| 40° F | Severe | Very slight. |
| R.T. | do | Do. |

[1] Room temperature.
[2] Concrete broke before epoxy pulled away.

EXAMPLE 15

Formulation A was prepared from 100 parts of Araldite 471–X75. 5.6 parts of methyl n-propyl ketone. 9.4 parts of Hardener 955, 17.2 parts of methyl alcohol, 5 parts of 2-nitropropane, 4.8 parts of the triethylene diamine salt of thiocyanic acid and 0.4 part of 2-ethyl-4-methyl imidazole.

A second formulation B was prepared from 100 parts of Araldite 471–X75, 5.6 parts of methyl n-propyl ketone, 34.3 parts of Pentamid 815 and 14.7 parts of xylene.

The evaluation of the resulting clear epoxy coatings is set forth below:

|  | A | B |
|---|---|---|
| Gloss, 60°, cured 7 days at— |  |  |
| 75° F | 100+ | 100+ |
| 37° F | 100+ | 100+ |
| Pencil hardness, cured 7 days at— |  |  |
| 75° F | 3H | F |
| 37° F | H | B |
| Sward hardness, cured 7 days at— |  |  |
| 75° F | 26 | 20 |
| 37° F | 10 | 2 |
| Abrasion resistance,[1] cured 7 days at— |  |  |
| 75° F | 25-30 | 53-58 |
| 37° F | 16-18 | ([2]) |
| Adhesion: |  |  |
| Scotch tape, No. of squares retained, cured 7 days: |  |  |
| 75° F | 100 | 0 |
| 37° F | 100 | 100 |
| Knife, 10 best, cured 7 days: |  |  |
| 75° F | 8 | 4 |
| 37° F | 6-8 | 2 |
| Impact resistance (inch pounds): |  |  |
| Direct, cured 7 days: |  |  |
| 75° F | 14 | 22 |
| 37° F | 7 | ([2]) |
| Reverse, cured 7 days: |  |  |
| 75° F | 4 | 25 |
| 37° F | <2 | ([2]) |

[1] Lites of sand/mil of film recovered.
[2] Film too soft to test.

EXAMPLE 16

Identical flooring compositions A and B were prepared containing 200 parts of Araldite 507, 56 parts of Hardener 955, 2 parts of 2-ethyl-4-methyl imidazole and 1000 parts of sand. In addition, formulation A contained 12.2 parts of the triethylene diamine salt of thiocyanic acid and formulation B contained 16.2 parts of the dithiocyanic acid salt of triethylene diamine.

These formulations were evaluated and the results of the evaluation are set forth below:

|  | A | B |
|---|---|---|
| Tack free time (hours): |  |  |
| 40° F., 75% R.H.[1] | 28-30 | 20-23 |
| 73° F., 50% R.H. | 5.7 | 2+ |
| Shore D hardness(73° F. and 50% R.H. after 72 hours) | 33 | 82 |
| Compressive strength at 40° F.(p.s.i.): |  |  |
| 2 days | 870 | 315 |
| 3 days | 2,040 | 1,200 |
| 4 days | 3,200 | 2,000 |
| 7 days | 4,700 | 4,930 |
| 10 days | 8,560 | 7,800 |
| 21 days | 9,800 | 6,200 |
| Chemical resistance:[2] |  |  |
| Cured 14 days at 73° F. and 50% R.H.: |  |  |
| Distilled water | 1.24 | 2.11 |
| 10% HCl | 2.02 | 2.69 |
| 10% H₂SO₄ | 1.98 | 2.79 |
| 10% HNO₃ | 2.84 | 2.75 |
| 10% NaOH | 2.62 | 2.89 |
| 10% acetic acid | 8.47 | 16.2 |
| Methyl ethyl ketone | 17.1 | 15.3 |
| Xylene:isopropanol | 5.34 | 18.5 |
| Cured 14 days at 40° F. and 75% R.H.: |  |  |
| Distilled water | 1.02 | 1.90 |
| 10% HCl | 1.15 | 2.64 |
| 10% H₂SO₄ | 2.04 | 3.04 |
| 10% HNO₃ | 1.32 | 2.29 |
| 10% NaOH | 1.41 | 1.64 |
| 10% acetic acid | 15.1 | 17.2 |
| Methyl ethyl ketone | 8.91 | 8.31 |
| Xylene:isopropanol | 19.7 | 10.5 |

[1] R. H.= Relative humidity.
[2] Percent weight absorbed after 24 hours immersion.

EXAMPLE 17

Identical formulations, A and B, were prepared containing 100 parts of Araldite 507, 31.5 parts of Hardener 955 and 8.6 parts of Pentamid 840. 6.6 parts of the triethylene diamine salt of thiocyanic acid were added to formulation A. Formulation B contained 5.7 parts of triethylene diamine.

The evaluation of formulations A and B is set forth below:

|  | A | B |
|---|---|---|
| Track free time, hours at 40° F | 22-26 | 31-46 |
| Pencil hardness: |  |  |
| 2 days, 40° F | H | HB |
| 7 days, 40° F | 2H | H |
| 2 days, RT [1] | F | 2H |
| 7 days, RT | 3H | 3H |
| Solvent resistance percent wt. gain after 7 days immersion in a 1:1 xylene-isopropanol mixture: |  |  |
| Cured 7 days, 40° F | 72.8 | 80.2 |
| Cured 7 days, RT | 62.4 | 60.3 |
| Acetic acid resistance, percent wt. gain after 7 days immersion in 10% acetic acid: Cured 7 days, RT | 41.1 | 56.1 |

[1] Room temperature.

EXAMPLE 18

Three formulations were prepared from similar compositions containing 100 parts of Araldite 6005, 28 parts of Hardener 955 and 1 part of 2-ethyl-4-methyl imidazole. Formulation A contained 4 parts of methyl triethylene diamine. Formulation B contained 8.1 parts of the dithiocyanic acid salt of triethylene diamine (prepared in accordance with Example 3). Formulation C contained 6.1 parts of the monothiocyanic acid salt of triethylene diamine (prepared in accordance with Example 1).

The evaluation of formulations A, B and C is set forth in the following table:

|  | A | B | C |
|---|---|---|---|
| Track free time, hours: |  |  |  |
| 40° F., 75% R.H. | 31+ | 12-16 | 10-19 |
| 73° F., 50% R.H. | 4-7 | 4 | 4 |
| Pencil hardness, 7 days: |  |  |  |
| 40° F., 75% R. H. | F | F | F |
| 73° F., 50% R.H. | F | 3H | 3H |
| Solvent resistance [2]: |  |  |  |
| 40° F., 75% R. H. | 52.1 | 53.2 | 58.4 |
| 73° F., 50% R. H. | 40.1 | 54.9 | 45.8 |
| Solvent resistance [3]: |  |  |  |
| 40° F., 75% R. H. | 11.2 | 16.7 | ([4]) |
| 73° F., 50% R. H. | 3.4 | 7.3 | 4.2 |
| Acetic acid resistance [5]: |  |  |  |
| 40° F., 75% R. H. | 34.1 | 21.4 | 33.0 |
| 73° F., 50% R. H. | 32.8 | 22.8 | 24.9 |
| Acetic acid resistance [6]: |  |  |  |
| 40° F., 75% R. H. | +4.7 | +3.5 | +5.0 |
| 73° F., 50% R. H. | +6.9 | +4.2 | +4.8 |

[1] R.H.=Relative humidity.
[2] Percent weight gained after 7 days immersion in 1 to 1 xylene: isopropanol mixture (cured 7 days).
[3] Percent weight extracted during 7 days immersion in 1 to 1 xylene: isopropanol mixture (cured 7 days).
[4] Unable to weigh sample.
[5] Percent weight gained after 7 days immersion in 10% acetic acid (cured 7 days).
[6] Percent extracted during 7 days immersion in 10% acetic acid.

EXAMPLE 19

100 parts of Araldite 6005, 28 parts of Hardener 953, 4 parts of methyl triethylene diamine and 1.6 parts of the 2-ethyl - 4 - methyl imidazole salt of acetic acid (prepared in accordance with Example 12) were blended together as a control for a similar blend of 100 parts of Araldite 6005, 28 parts of Hardener 955, 4 parts of methyl triethylene diamine and 1.6 parts of the 2-ethyl-4-methyl imidazole salt of thiocyanic acid (prepared in accordance with Example 6).

These formulations were then evaluated as maintenance coatings. In the following table the formulation prepared with the acetic acid salt is labeled as A and the formulation prepared with the salt of thiocyanic acid is labeled as B.

|  | A | B |
|---|---|---|
| Tack free time (hours) |  |  |
| 40° F | 47+ | 13 |
| Room temperature | 9 | 8 |
| Pencil hardness (48 hours): |  |  |
| 40° F | <6B | 4B |
| Room temperature | H | F |
| Pencil hardness (7 days): |  |  |
| 40° F | H | 2H |
| Room temperature | 3H | 3H |
| Solvent weight gain percent (cured 7 days): |  |  |
| 40° F | 31.4 | 25.8 |
| Room temperature | 24.7 | 23.2 |

EXAMPLE 20

Five formulations (formulations A through E) were prepared from 50 parts of Araldite 507, 50 parts of Araldite 6005 and 18.4 parts of Hardener 956. Formulation B also contained 0.6 part of water. Formulations C, D and E also contained 1 part of 1-ethyl-4-methyl imidazole and 5 parts of the thiocyanic acid salt of triethylene diamine. In addition, formulations C, D and E contain water in the amount of 0.3 part, 0.6 part and 0.9 part, respectively.

Formulations A through E were evaluated and the results of these evaluations are set forth below:

|  | A | B | C | D | E |
|---|---|---|---|---|---|
| Tack free time, hours: |  |  |  |  |  |
| 35° F | 48+ | 48+ | 32-48 | 6-9 | 6-9 |
| RT | <16 | <16 | 8-11 | 3 | <4 |
| Pencil hardness: |  |  |  |  |  |
| 2 days, 35° F | HB [1]2 | HB [1]3 | B | F | F |
| 7 days, 35° F | H | F | H | H | H |
| 2 days, RT | HB [1]2 | H [1]3 | H | 2H | 3H |
| 7 days, RT | H | H | 2H | 2H | 2H |
| Chemical resistance, percent wt. gain after 7 days immersion in xylene-isopropanol: |  |  |  |  |  |
| Cured 7 days, 35° F | 38.9 | 36.1 | ([2]) | 12.6 | 30.5 |
| Cured 7 days, RT | 15.3 | 13.23 | ([2]) | ([3]) | 18.3 |

[1] Surface exudation— 1=Slight; 2=Moderate; 3=Severe.
[2] Sample highly swollen and discolored.
[3] Sample damaged during experiment, unable to weigh.
NOTE.—RT=Room temperature.

EXAMPLE 21

Three formulations were prepared each employing 100 parts of Araldite 507. The first formulation (formulation A) also contained 23 parts of Hardener 956. Formulation H contained 18.4 parts of Hardener 956, 5 parts of the triethylene diamine salt of thiocyanic acid, 1 part of 2-ethyl-4-methyl imidazole and 0.6 part of water. Formulation C contained 18.4 parts of Hardener 956, 5 parts of the triethylene diamine salt of thiocyanic acid, 1 part of 2-ethyl-4-methyl imidazole and 2.4 parts of water.

These formulations were evaluated and the results of the evaluations are shown below:

|  | A | B | C |
|---|---|---|---|
| Tack free time, hours at 35° F | 92+ | 18-22 | 22-25 |
| Pencil hardness: |  |  |  |
| 4 days, 35° F | B [1]3 | H | H [1]2 |
| 7 days, 35° F | F [3]3 | 2H | F [2]2 |
| 4 days, RT | H [1]1 | H | H |
| 7 days, RT | 2H [1]1 | 3H | 3H |
| Chemical resistance, percent wt. gain after 4 days immersion xlene-isopropanol: |  |  |  |
| Cured 7 days, 35° F | ([2]) | 45.4 | 36.7 |
| Cured 7 days, RT | ([2]) | 28.1 | 17.8 |
| 10% acetic acid: |  |  |  |
| Cured 7 days, 35° F | ([2]) | 218.7 | 87.1 |
| Cured 7 days, RT | 29.2 | 48.7 | 47.1 |

[1] 1=Slight amine blush; 2=Moderate amine blush; 3=Severe amine blush.
[2] Sample disintegrated during test
NOTE.—RT=Room temperature.

EXAMPLE 22

Two formulations were prepared by blending 50 parts of Araldite 507 and 50 parts of Araldite 6005. Formulation A also contained 23 parts of Hardener 956. Formulation B also contained 18.4 parts of Hardener 956, 5 parts of the triethylene diamine salt of thiocyanic acid, 1 part of 2-ethyl-4-methyl imidazole, and 0.6 part of water. Both formulations A and B contained 500 parts of sand.

Formulations A and B were evaluated to determine the compressive strength of the cured epoxy resin after 1, 4 and H days. The results of the evaluations are shown below:

| | A | B |
|---|---|---|
| Compressive strength, p.s.i., cured, days at 37–42° F.: | | |
| 1 | 570 | 2,580 |
| 4 | 6,360 | 7,380 |
| 11 | 9,300 | 9,800 |

EXAMPLE 23

A formulation was prepared containing 100 parts of Araldite 6005, 28 parts of Hardener 955, 1 part of 1-ethyl-4-methyl imidazole and 6.6 parts of the tertiary amine salt prepared in accordance with Example 7.

This formulation was evaluated and the results of the evaluation are shown below.

Tack free time:
  Hours—
    40° F. ———————————————— 19
    Room temperature ———————— 5
Pencil Hardness:
  48 hrs.—
    40° F. ———————————————— F
    Room temperature ———————— F
  7 days—
    40° F. ———————————————— H
    Room temperature ———————— 3H
Solvent weight gain, percent:
  Cured 7 days—
    40° F. ———————————————— 39.7
    Room temperature ———————— 21.5
Solvent weight loss, percent:
  Cured 7 days—
    40° F. ———————————————— 7.5
    Room temperature ———————— 1.1

EXAMPLE 24

A formation (A) was prepared by blending 100 parts of Araldite 6005, 28 parts of Hardener 955, 4 parts of methyltriethylene diamine, 1.8 parts of 2-ethyl-4-methyl imidazole and 1 part of the monoacetic acid salt of methyltriethylene diamine.

A second formulation (B) was prepared by blending 100 parts of Araldite 6005, 28 parts of Hardener 955, 4 parts of methyltriethylene diamine, and 1.6 parts of the tertiary amine salt prepared in accordance with Example 8.

These formulations were evaluated and the results the evaluations are shown below:

| | A | B |
|---|---|---|
| Track free time, hours: | | |
| 40° F | 25 | 13 |
| R.T.[1] | 7 | 8 |
| Pencil hardness: | | |
| 48 hrs.— | | |
| 40° F | 2B | 4B |
| R.T. | F | F |
| 7 days— | | |
| 40° F | F | 2H |
| R.T. | H | 3H |
| Solvent weight gain percent, cured 7 days: | | |
| 40° F | 29,6 | 25,8 |
| R.T. | 26,1 | 23,2 |
| Solvent weight loss percent, cured 7 days: | | |
| 40° F | 2,8 | 11,3 |
| R.T. | 2,8 | 11,3 |

[1] R.T.=Room temperature.

EXAMPLE 25

A formulation was prepared by blending 200 parts of Araldite 507, 56 parts of Hardener 955, 2 parts of 2-ethyl-4-methyl imidazole, 1000 parts of sand and 18.2 parts of the tertiary amine salt prepared in accordance with Example 11.

This formulation was evaluated and the results of the evaluation are set forth below.

Tack free time:
  Hours—
    40° F.—75% R.H. ———————————— 44–48
    73° F.—50% R.H. ———————————— 4+
Shore D Hardness at 73° F. and 50% R.H. after 72 hours ———————————————————— 81
Compressive strength at 40° F., in p.s.i.:
  Days—
    2 ———————————————————————— 50
    3 ———————————————————————— 375
    4 ———————————————————————— 900
    7 ———————————————————————— 1700
    14 ——————————————————————— 2500
    16 ——————————————————————— 3000
    21 ——————————————————————— 6900

From the foregoing it will be seen that this invention is well adapted to obtain all of the ends and objects hereinabove set forth, together with other advantages which are obvious and which are inherent to the system.

Thus, a low temperature epoxy curing system is provided by the present invention in which certain tertiary amine salts of hydrobromic acid, paratoluene sulfonic acid, 2-ethylhexoic acid or thiocyanic acid act to accelerate epoxy curing agents in a manner such that epoxy resins are cured at a practical and acceptable rate at temperatures as low as 35° F. It has been shown that the low temperature epoxy curing system of the present invention can be used advantageously for epoxy maintenance coating and flooring applications. Extremely rapid curing is obtained when either triethylene diamine or methyl triethylene diamine is used as the tertiary amine in the accelerator and including 0.3 to 2.4 parts of water per hundred parts of resin with the accelerator in the curing system. It has also been found that the rate of curing obtained using the epoxy curing system of the present invention can be improved by the addition of 2-ethyl-4-methyl imidazole in an amount between 0 and 5 parts per hundred parts of resin. Another feature of the present invention is the relatively low dermatitis hazard present with the use of the curing system.

What is claimed is:

1. The method of claim 1 which comprises combining between about 0.3 and 2.4 parts of water per hundred parts of the resin with the epoxy resin, curing agent and accelerator.

2. The method of claim 1, in which the curing agent and the tertiary amine salt are mixed together before they are combined with the epoxy resin.

3. The method of claim 1, in which the tertiary amine is triethylene diamine.

4. The method of claim 1, in which the tertiary amine is methyl triethylene diamine.

5. The method of claim 1, in which the tertiary amine is 2-ethyl-4-methyl imidazole.

6. The method of claim 1, which comprises combining 2-ethyl-4-methyl imidazole with the epoxy resin, curing agent and tertiary amine salt in an amount in the range of 0 to 5 parts of 2-ethyl-4-methyl imidazole per hundred parts of the epoxy resin.

7. The method of curing epoxy resins which comprises,
  combining a curable epoxy resin with a curing agent and a low temperature curing accelerator,
  said curing agent being at least one member of the group consisting of a modified liquid amidoamine, having an equivalent weight in the range of 60 to 90 and a viscosity in centipoises at 25° C. in the range of 150 to 900; a low viscosity, modified amine having an amine nitrogen value percent in the range of 23.5 to 27 and a viscosity in centipoises at 25° C. in the range of 300 to 600; and a polyamide, having an amine value in the range of 85 to 400, and a viscosity in poises in the range of 7–12 at 150° C. to 750–30 at 40° C.;

said low temperature curing accelerator being the tertiary amine salt of hydrobromic acid, paratoluene sulfonic acid, 2-ethyl-hexoic acid or thiocyanic acid; said tertiary amine being triethylene diamine, methyl triethylene diamine or 2-ethyl-4-methyl imidazole;

the weight ratio of said low temperature curing accelerator to said curing agent being from about 0.01:1 to 0.73:1;

the amount of curing agent employed being from about 11 to 150 parts per 100 parts of epoxy resin;

and curing at a temperature of at least 35° F.

References Cited
UNITED STATES PATENTS

| | | | |
|---|---|---|---|
| 3,222,279 | 12/1965 | Loeffler | 260—2 EC |
| 3,356,645 | 12/1967 | Warren | 260—2 EC |
| 3,403,131 | 9/1968 | Garnish | 260—2 EC |
| 3,420,794 | 1/1969 | May et al. | 260—2 N |

LEON D. ROSDOL, Primary Examiner

I. GLUCK, Assistant Examiner

U.S. Cl. X.R.

252—182; 260—2 EC, 2 N, 18 EP, 47 EC

UNITED STATES PATENT OFFICE
CERTIFICATE OF CORRECTION

Patent No. 3,763,098    Dated October 2, 1973

Inventor(s)    Harold A. Green and Robert G. Petrella

It is certified that error appears in the above-identified patent and that said Letters Patent are hereby corrected as shown below:

Column 2, line 50 "Araldite 741- x 75*" should read --Araldite 741 x 75*--.

Column 3, line 8 under Column headed 800 and across from Viscosity, Poises at 40°C, "7 - 12" should read --7 - 12$^1$--.

Column 10, line 46 under Example 16, under A, across from Shore D Hardness, "33" should read --83--.

Column 14, line 16, under Ex.25, opposite Days-14, "2500" should read --2550--.

In the claims, column 14, line 46 et seq.
claim 7 should be renumbered as claim 1. Claims 1-6 should be renumbered as claims 2-7.

Signed and sealed this 30th day of July 1974.

(SEAL)
Attest:

McCOY M. GIBSON, JR.
Attesting Officer

C. MARSHALL DANN
Commissioner of Patents